(12) United States Patent
Pope et al.

(10) Patent No.: US 7,220,813 B2
(45) Date of Patent: May 22, 2007

(54) APPLICATION OF PHOTOCURABLE PRE-CERAMIC POLYMERS

(75) Inventors: Edward J. A. Pope, Oak Park, CA (US); Kenneth M. Kratsch, Idyllwild, CA (US)

(73) Assignee: Global Strategic Materials LLC, Westlake Village, CA (US)

( * ) Notice: Subject to any disclaimer, the term of this patent is extended or adjusted under 35 U.S.C. 154(b) by 0 days.

(21) Appl. No.: 09/782,945

(22) Filed: Feb. 13, 2001

(65) Prior Publication Data

US 2003/0232946 A1    Dec. 18, 2003

Related U.S. Application Data

(63) Continuation-in-part of application No. 09/325,524, filed on Jun. 3, 1999, now Pat. No. 6,403,750.

(51) Int. Cl.
C08G 77/08        (2006.01)

(52) U.S. Cl. .............................. 528/14; 528/25; 528/32; 528/43; 556/430; 556/478

(58) Field of Classification Search ................ 528/25, 528/32, 14, 43; 556/430, 478
See application file for complete search history.

(56) References Cited

U.S. PATENT DOCUMENTS

| | | | |
|---|---|---|---|
| 4,199,387 A | 4/1980 | Hladik | |
| 4,310,481 A | 1/1982 | Baney | |
| 4,310,482 A | 1/1982 | Baney | |
| 4,414,403 A | 11/1983 | Schilling, Jr. et al. | |
| 4,472,591 A | 9/1984 | Schilling, Jr. et al. | |
| 4,477,771 A | 10/1984 | Nagy et al. | |
| 4,505,726 A | 3/1985 | Takeuchi et al. | |
| 4,588,832 A * | 5/1986 | Ishihara et al. | 556/478 |
| 4,631,179 A | 12/1986 | Smith, Jr. | |
| 4,800,211 A | 1/1989 | Tischler et al. | |
| 4,800,221 A * | 1/1989 | Marko | 528/10 |
| 4,806,612 A * | 2/1989 | Chandra et al. | 528/10 |
| 4,816,497 A | 3/1989 | Lutz et al. | |
| 4,825,651 A | 5/1989 | Puschner et al. | |
| 4,835,238 A | 5/1989 | Burns et al. | |
| 4,847,027 A | 7/1989 | Lu | |
| 4,923,716 A | 5/1990 | Brown et al. | |
| 4,934,141 A | 6/1990 | Ollivon et al. | |
| 4,940,767 A * | 7/1990 | Barton et al. | 528/35 |
| 5,028,571 A | 7/1991 | Pillot et al. | |
| 5,049,529 A | 9/1991 | Duboudin et al. | |
| 5,051,215 A | 9/1991 | Rabe et al. | |
| 5,064,915 A | 11/1991 | Duboudin et al. | |
| 5,074,112 A | 12/1991 | Walton et al. | |
| 5,091,271 A | 2/1992 | Sawaki et al. | |
| 5,126,529 A | 6/1992 | Weiss et al. | |
| 5,138,080 A | 8/1992 | Jung et al. | |
| 5,153,295 A | 10/1992 | Whitmarsh et al. | |
| 5,169,916 A | 12/1992 | Weber et al. | |
| 5,171,810 A | 12/1992 | Weber et al. | |
| 5,300,605 A | 4/1994 | Weber et al. | |
| 5,365,042 A | 11/1994 | Benoit et al. | |
| 5,446,270 A | 8/1995 | Chamberlain et al. | |
| 5,512,351 A | 4/1996 | Miyamichi et al. | |
| 5,626,707 A | 5/1997 | Hadzicki et al. | |
| 5,632,834 A | 5/1997 | Ostertag et al. | |
| 5,641,817 A | 6/1997 | Aghajanian et al. | |
| 5,698,055 A | 12/1997 | Benkoczy | |
| 5,707,471 A | 1/1998 | Petrak et al. | |
| 5,714,025 A | 2/1998 | Brungardt | |
| 5,732,743 A | 3/1998 | Livesay | |
| 5,756,412 A | 5/1998 | Lee et al. | |
| 5,808,282 A | 9/1998 | Apté et al. | |
| 5,820,483 A | 10/1998 | Preece et al. | |
| 5,843,304 A | 12/1998 | Marchessault et al. | |
| 5,843,860 A | 12/1998 | Kim et al. | |
| 5,888,641 A | 3/1999 | Atmur et al. | |
| 5,902,514 A | 5/1999 | Park et al. | |
| 6,063,150 A | 5/2000 | Peter et al. | |
| 6,063,327 A | 5/2000 | Semff | |
| 6,101,793 A | 8/2000 | Nagai et al. | |
| 6,165,240 A | 12/2000 | Hodge | |
| 6,174,565 B1 | 1/2001 | Daws et al. | |
| 6,403,750 B1 * | 6/2002 | Pope et al. | 528/25 |

* cited by examiner

Primary Examiner—Margaret G. Moore
(74) Attorney, Agent, or Firm—Connolly Bove Lodge & Hutz LLP; Jonathan A. Jaech

(57) ABSTRACT

A process for synthesizing photocurable poly(ethynyl) carbosilane includes the steps of mixing dichlorosilane and trichlorosilane reagents, adding sub-stoichiometric amounts of alkali metal and adding excess sodium acetylide.

8 Claims, 2 Drawing Sheets

APPLICATION OF PHOTOCURABLE PRE-CERAMIC POLYMERS

This application is a continuation-in-part of an application filed Jun. 3, 1999 under Ser. No. 09/325,524, now U.S. Pat. No. 6,403,750, which application are incorporated herein, in their entirety, by reference.

BACKGROUND OF THE INVENTION

The present invention concerns methods of synthesizing photo-curable preceramic polymers, and more particularly, poly(ethynyl)carbosilane.

Silicon carbide (SiC) is one of several advanced ceramic materials which are currently receiving considerable attention as electronic materials, as potential replacements for metals in engines, and for a variety of other applications where high strength, combined with low density and resistance to oxidation, corrosion and thermal degradation at temperatures in excess of 1000° C. are required. Unfortunately, these extremely hard, non-melting ceramics are difficult to process by conventional forming, machining, or spinning applications rendering their use for many of these potential applications problematic. In particular, the production of thin films by solution casting, continuous fiber by solution or melt spinning, a SiC matrix composite by liquid phase infiltration, or a monolithic object using a precursor-based binder/sintering aid, all require a source of SiC which is suitable for solution or melt processing and which possesses certain requisite physical and chemical properties which are generally characteristic of polymeric materials.

Polymeric precursors to ceramics such as SiC afford a potential solution to this problem as they would allow the use of conventional processing operations prior to conversion to ceramic. A ceramic precursor should be soluble in organic solvents, moldable or spinnable, crosslinkable, and give pure ceramic product in high yield on pyrolysis. Unfortunately, it is difficult to achieve all these goals simultaneously. Currently available SiC precursor systems are lacking in one or more of these areas. Problems have been encountered in efforts to employ the existing polysilane and polycarbosilane precursors to SiC for preparation of SiC fiber and monolithic ceramic objects. All of these precursors have C/Si ratios considerably greater than one, and undergo a complex series of ill-defined thermal decomposition reactions which generally lead to incorporation of excess carbon. The existence of even small amounts of carbon at the grain boundaries within SiC ceramics has been found to have a detrimental effect on the strength of the ceramic, contributing to the relatively low room-temperature tensile strengths typically observed for precursor-derived SiC fibers.

Efforts to develop polymeric precursors to SiC have focused largely on two types of polymers, polysilanes, which have a Si—Si backbone, and polycarbosilanes, in which the polymer backbone is [—Si—C—].sub.n. The polysilanes all suffer from problems due to insolubility, infusibility and/or excess carbon incorporation. Certain of the polycarbosilanes have more suitable physical properties for processing; however, in general, these also contain a higher-than-1:1 C:Si ratio and incorporate excess carbon on pyrolysis.

In the case of the polycarbosilanes, high molecular weight linear polymers of the type $[R_2SiCH_2]_n$, where R is H and/or hydrocarbon groups, have been prepared by ring-opening-polymerization reactions starting from cyclic disilacyclobutanes using chloroplatinic acid and related catalyst systems; however, such linear polycarbosilanes generally exhibit low yields of ceramic product on pyrolysis due to chain "unzipping" reactions. For example, studies of high molecular weight $[Me_2SiCH_2]_n$ polymers have indicated virtually complete volatilization on pyrolysis under an inert atmosphere to 1000° C.

Use of propargyl groups ($HC{\equiv}CCH_2$—), such as propargyl chloride ($HC{\equiv}CCH_2Cl$), propargyl bromide ($HC{\equiv}CCH_2Br$), propargyl alcohol ($HC{\equiv}CCH_2OH$), propargyl magnesium chloride ($HC{\equiv}CCH_2MgCl$), propargyl calcium chloride ($HC{\equiv}CCH_2CaCl$), propargyl amine ($HC{\equiv}CCH_2NH_2$), and other propargyl-containing species introduces the photo-curable (cross-linkable) triple-bonded carbon linkages into the pre-ceramic polymer.

U.S. Pat. No. 5,153,295 teaches the use of preceramic polymers with an Si—C backbone structure, such as allyl-hydridopolycarbosilane (AHPCS), formed from the Grignard coupling reaction of a halomethylcarbosilane followed by reduction using a metal hydride in which either a UV cross-linkable ethynyl (i.e. acetylide) or propargy] group has been introduced into the polymer. A key feature of these polymers is that substantially all of the linkages between the Si—C units are "head-to-tail", i.e., they are Si to C. The polycarbosilane "$SiH_2CH_2$" has a carbon to silicon ratio of 1 to 1 and where substantially all of the substituents on the polymer backbone are hydrogen. These polymers have the advantage that it is only necessary to lose hydrogen during pyrolysis, thus ceramic yields of over 90% are possible, in principle. The extensive Si—H functionality allows facile crosslinking and the 1 to 1 carbon to silicon ratio and avoids the incorporation of excess carbon in the SiC products that are ultimately formed. The synthetic procedure employed to make them allows facile modification of the polymer, such as by introduction of small amounts of pendant vinyl groups, prior to reduction. The resulting vinyl-substituted "$SiH_2CH_2$" polymer has been found to have improved crosslinking properties and higher ceramic yield.

A pre-ceramic polymer has been prepared by a thermally induced methylene insertion reaction of polydimethylsilane. The resulting polymer is only approximately represented by the formula $[SiHMeCH_2]_n$, as significant amounts of unreacted $(SiMe_2)_n$ units, complex rearrangements, and branching are observed. In addition to the carbosilane "units", large amounts of Si—Si bonding remains in the "backbone" of the polymer. This polymer disadvantageously contains twice the stoichiometric amount of carbon for SiC formation. The excess carbon must be eliminated through pyrolytic processes that are by no means quantitative. Despite the shortcomings, this polymer has been employed to prepare "SiC" fiber. However, it must be treated with various crosslinking agents prior to pyrolysis which introduce contaminants. This results in a final ceramic product that contains significant amounts of excess carbon and silica which greatly degrade the high temperature performance of the fiber.

SiC precursors, predominately linear polycarbo-silanes, have been prepared via potassium dechlorination of chloro-chloromethyl-dimethylsilane. The resulting polymers have not been fully characterized, but probably contain significant numbers of Si—$S_1$ and $CH_2$—$CH_2$ groups in the polymer backbone. The alkali metal dechlorination process used in the synthesis of such materials does not exhibit the selective head-tail coupling found with Grignard coupling. The pendant methyl groups in such materials also lead to the incorporation of excess carbon into the system. In several polymer systems mixtures containing vinylchlorosilanes (such as $CH_2{\equiv}CH$—$Si(Me)Cl2$) and $Me_2SiCl_2$ are coupled by dechlorination with potassium in tetrahydro-furan. U.S. Pat. No. 4,414,403 and U.S. Pat. No. 4,472,591 both teach this method. The "backbone" of the resulting polymers consists of a combination of Si—Si and Si—CH$_2$CH(—Si)$_2$ units. Later versions of this polymer Me(H)SiCl$_2$ in addition to the Me$_2$SiCl$_2$ and are subjected to a sodium-hydrocarbon dechlorination process which does not attack vinyl groups. The resulting polymer consists of a predominately linear, Si—Si "backbone" bearing pendant methyl groups, with some Si—H and Si—CH≡CH$_2$ functionality to allow crosslinking on pyrolysis.

None of these precursors derived using vinylchlorosilanes are similar to those of the process in that having predominantly Si—Si bonded "backbones", they are essentially polysilanes, not polycarbosilanes. In addition, the carbon in these polymers is primarily in the form of pendant methyl functionality and is present in considerable excess of the desirable 1 to 1 ratio with silicon. The ceramic products obtained from these polymers are known to contain considerable amounts of excess carbon.

Polymeric precursors to SiC have been obtained by redistribution reactions of methyl-chloro-disilane (Me$_{6-x}$Cl$_x$Si$_2$, x=2–4) mixtures, catalyzed by tetraalkyl-phosphonium halides which U.S. Pat. No. 4,310,481, U.S. Pat. No. 4,310,482 and U.S. Pat. No. 4,472,591 teach. In a typical preparation, elemental analysis of the polymer was employed to suggest the approximate formula [Si(Me)$_{1.15}$(H)$_{0.25}$]$_n$, with n averaging about 20. The structures of the polymers involve what is reported to be a complex arrangement of fused polysilane rings with methyl substitution and a polysilane backbone.

The formation of carbosilane polymers with pendent methyl groups has been prepared as by-products of the "reverse-Grignard" reaction of chloromethyl-dichloro-methylsilane. The chief purpose of this work was the preparation of carbosilane rings and the polymeric byproduct was not characterized in detail nor was its use as a SiC precursor suggested. Studies of this material indicate that it has an unacceptably low ceramic yield on pyrolysis. These polymers contain twice the required amount carbon necessary for stoichiometric silicon carbide and their use as SiC precursors was not suggested. Moreover, the starting material, chloromethyl-dichloro-methylsilane, contains only two sites on the Si atom for chain growth and therefore cannot yield a structure which contains tbd.SiCH$_2$— chain units. On this basis, the structure of the polymer obtained, as well as its physical properties and pyrolysis characteristics, is not optimal for use as an SiC precursor.

U.S. Pat. No. 4,631,179 teaches a polymer which is a product of the ring-opening polymerization of (SiH$_2$CH$_2$)$_2$ also has the nominal composition "SiH$_2$CH$_2$". However, the actual structure of this polymer is reported to be a linear polycarbosilane which presumably has only [SiH$_2$CH$_2$] as the internal chain segments. The (SiH$_2$CH$_2$)$_2$ monomer used by Smith is difficult and expensive to prepare and not generally available.

SUMMARY OF THE INVENTION

The present invention is generally directed to a process of forming a photo-curable pre-ceramic polymer for use in for fabricating ceramic matrix composites.

In a first separate aspect of the invention the process includes the steps to silicon carbide ceramic.

In a second separate aspect of the invention the process includes the steps of reacting sodium acetylide with organochlorosilanes and condensing (polymerizing) the resultant organo-(ethynyl)-chloro silane product of step a with an excess of an alkali metal. The process includes the steps preparing a solution of thermoplastic photo-curable pre-ceramic polymer, passing a fiber, tape or fabric through the solution of thermoplastic photo-curable pre-ceramic polymer, applying the pre-preg to a shaped mandrel, using light energy to induce cross-linking of the photo-curable pre-ceramic polymer after application to the mandrel. The thermoplastic pre-ceramic polymer is cured and the cured thermoplastic pre-ceramic polymer matrix composite material can be pyrolyzed to prepare a ceramic material.

In a third separate aspect of the invention a single-step process for fabricating continuous ceramic fiber ceramic matrix composites employs a thermoplastic photo-curable pre-ceramic polymer in which the component is shaped by a variety of standard composite fabrication techniques, such as filament winding, tape winding, and woven cloth winding. The process includes steps of passing ceramic fiber monofilament, tow, mat, or woven cloth through a solution of the thermoplastic photo-curable pre-ceramic polymer, applying ceramic fiber monofilament, tow, mat, or woven cloth to a shaped mandrel, using photo-energy of the ultraviolet, visible or infrared light spectrum to induce cross-linking (curing) of the photo-curable pre-ceramic polymer after application to the mandrel, and either partially or completely pyrolyzing the now cured pre-ceramic polymer matrix composite material.

Other aspects and many of the attendant advantages will be more readily appreciated as the same becomes better understood by reference to the following detailed description.

The features of the present invention which are believed to be novel are set forth with particularity in the appended claims.

DESCRIPTION OF THE PREFERRED EMBODIMENT

Figure 1:
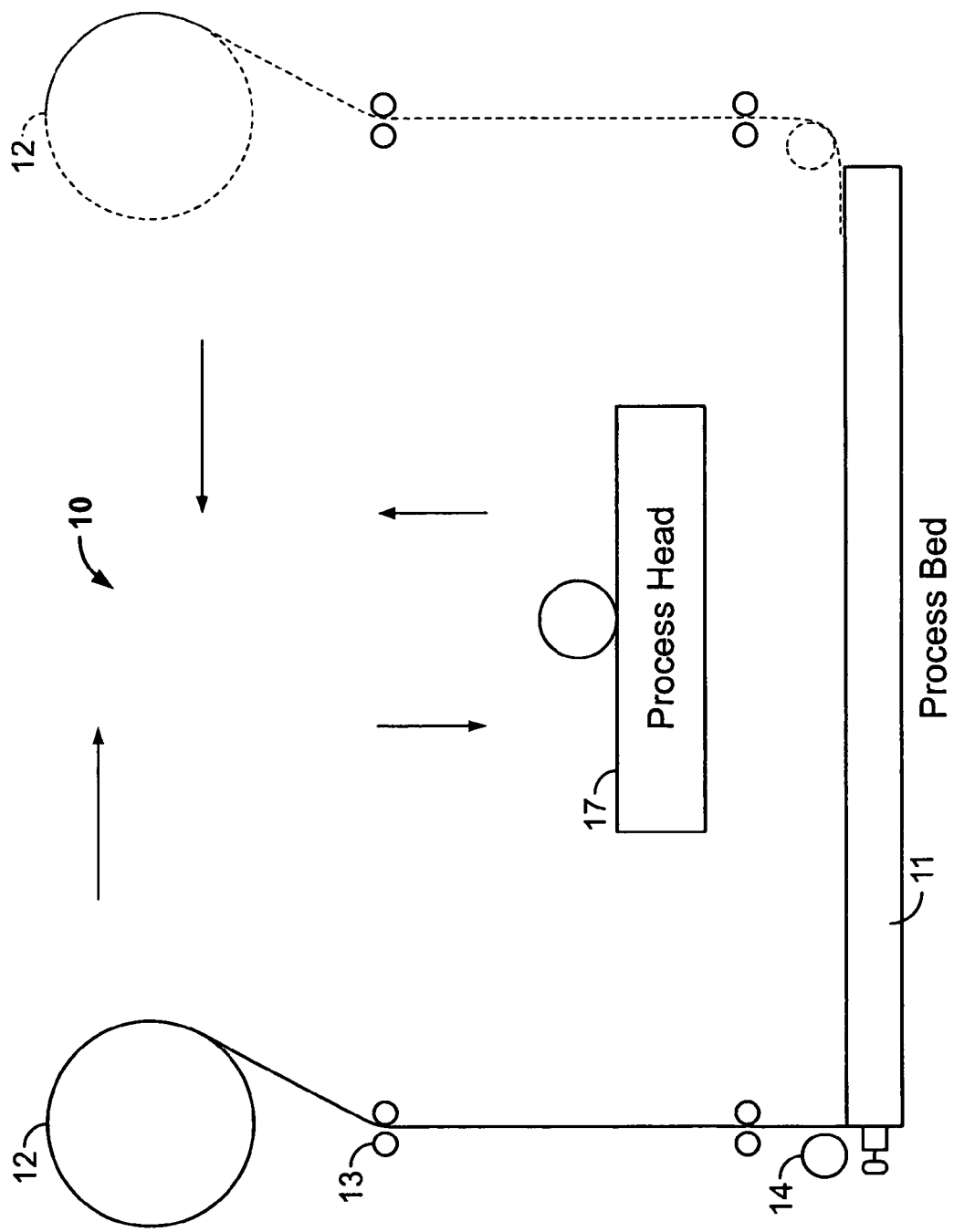
FIG. 1 is a schematic drawing of an apparatus for making flat plates of ceramic composites from photo-curable pre-ceramic polymers.

A continuous single step manufacturing process for fabricates dense low-porosity composites using novel cross-linkable pre-ceramic polymers and simple plastic industry technology adapted to the thermoset capability of the pre-ceramic polymer. The process eliminates the multi-cycle polymer impregnation pyrolysis method. The process is a simple controllable production process for fiber reinforced ceramic matrix composites, which can be easily automated into large manufacturing continuous processes. This process combines high-yield cross-linkable pre-ceramic polymers and a single step automated process mechanism to produce ceramic components on the scale of aircraft fuselages, boat hulls, and large single ceramic sheets for space vehicle skin panels. The process provides chemically modified pre-ceramic polymers which are very fluid at temperatures 60° C.–100° C., have high ceramic yields by weight of 75–95%, exhibit high purity and can be crosslinked into a thermoset with ultraviolet radiation.

The process synthesizes these polymers by a series of chemical substitutions using commercially available polymers to incorporate ethynyl side groups on the polymers.

The resulting polymers contain unstable carbon triple bonds and are cross-linked by hydrosilylation with Si—H groups upon photo-exposure. The process uses chemical substitution ethynyl side group chemistry to produce SiC, Si3N4, AL2O3 and AL3N4 and TiC upon pyrolysis after photo-exposure. Conversion of precursor polymers like polycarbosilane and polysilazane to poly(ethynyl)carbosilane and poly(ethynyl)silazane achieve this objective.

In an embodiment of the invention, a fiber, tape, fabric, or woven cloth is drawn onto a mandrel or suitable substrate, first passing through the chemically modified pre-ceramic polymer. The objective of this process is to saturate the fiber, tape, fabric, woven cloth with the very fluid pre-ceramic polymer and then photo-cure it on the mandrel or substrate as the saturated material is drawn along by motorized winding or pulling mechanisms known to the prior art. The process provides a continuous fabrication process to enable making a dense (total porosity <8%) fiber reinforced ceramic composite in a single step. This objective is achieved by compacting each layer of pre-ceramic polymer saturated material onto the already pyrolyzed layer below permitting excess polymer to impregnate this layer. The back-fill allowed here reduces the final component porosity, increases strength and provides a short path for volatiles to escape, mitigating interlayer delamination. This layer by layer buildup is continued until the required component thickness is reached.

The novel nature of the photocurable pre-ceramic polymer enables a process, which is unique to porous filters not achievable with conventional pre-ceramic polymers. This process employs the ability to thermoset the pre-ceramic polymer into a rubbery hard solid prior to heating. In this form the pre-ceramic polymer can be heated and subsequently pyrolyzed without flowing into unwanted areas of the filter. Because of the ability of this process to produce high yield beta-SiC in near Si—C stoichiometry a matrix or coating is formed upon sintering that is highly receptive to heating with microwave energy. The microwave susceptible porous filter is ideally suited for trapping particulate from diesel engine exhausts and can be regenerativly used by microwave heating to a temperature above the oxidation threshold of the trapped particulate soot. The pre ceramic polymer can be made to form not only SiC but also other ceramic bodies such as $Si_3N_4$, BC, LAS, etc.

Referring to FIG. 1, an apparatus 10 for making flat plates of ceramic composites from photo-curable pre-ceramic polymers includes a frame 11 with a process bed, a set of fabric rollers 12, a set of guide rollers 13, a set of drive rollers 14, a drive motor 15, a compression roller 16, a process head 17 having a light-emitting lamp, a furnace 18, a covering 19 and a source of inert gas and a control panel 20. The source of inert gas provides an inert atmosphere.

Figure 2:
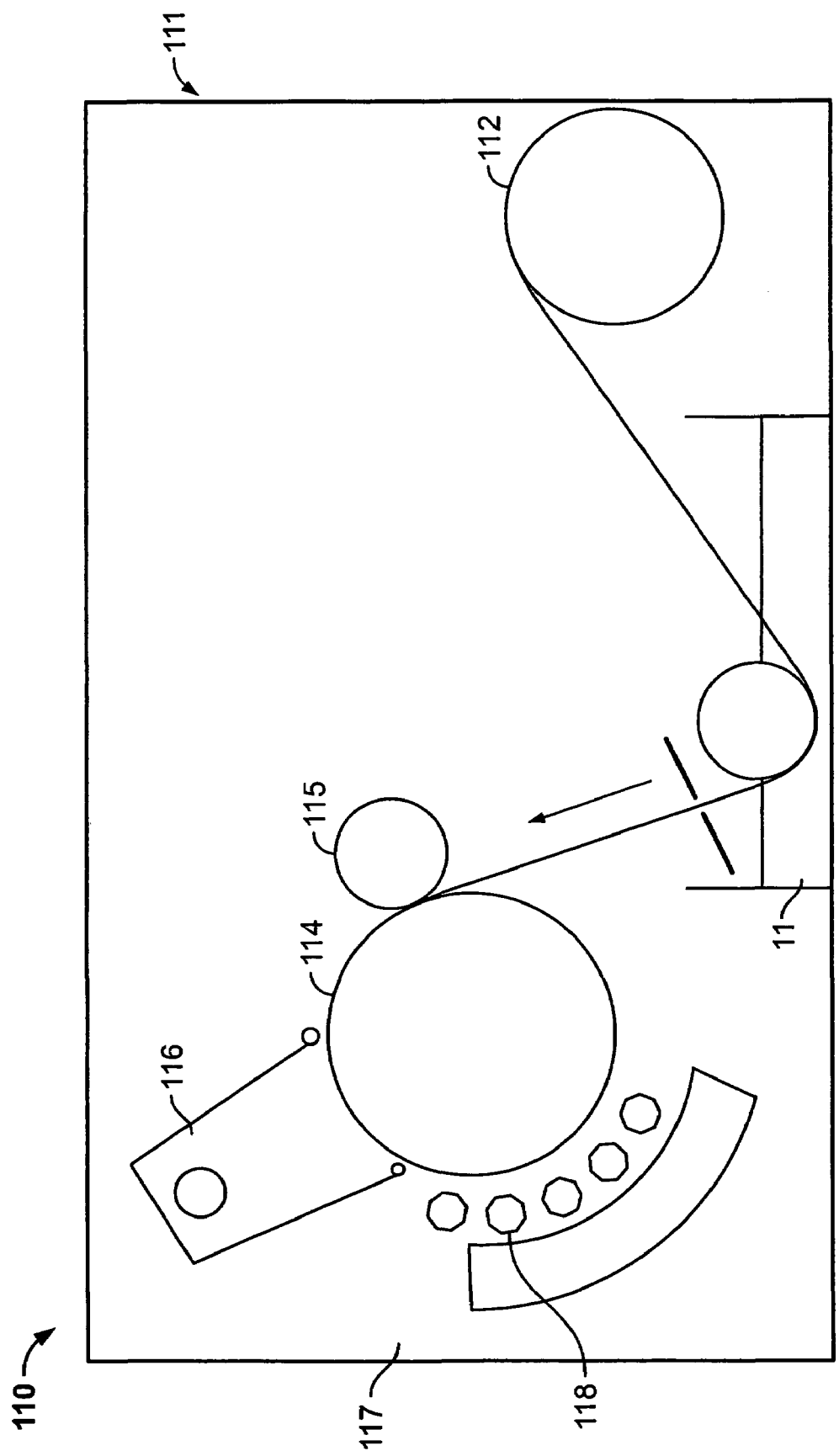
FIG. 2 is a schematic drawing of an apparatus for making cylinders of ceramic composites from photo-curable pre-ceramic polymers.

Referring to FIG. 2, an apparatus 110 for making cylinders of ceramic composites from photo-curable pre-ceramic polymers includes a dry nitrogen environmental chamber 111, a fabric roller 112, an applicator 113 of a photo-curable pre-ceramic polymer, a take-up mandrel 114, a pressure loaded compaction roller 115, a light-emitting lamp 116 and a consolidation and pyrolysis zone 117. The consolidation and pyrolysis zone 117 has a heater 118. The fabric roller dispenses woven ceramic fabric.

Commercially available polycarbosilanes and polycarbosiloxane polymers could be rendered photo-curable, by high intensity photo-radiation, through the addition of ethynyl side groups to the polymer. The polymer, poly(ethynyl)carbosilane, is rendered into an infusible thermoset upon photo-radiation. The process is able to similarly elevate ceramic yields to about 85% by weight.

It has been demonstrated that various combinations of di-functional and tri-functional silane precursors can be utilized to enhance cross-linking and elevate ceramic yield. Combinations of dichlorodimethylsilane (di-functional) and trichlorophenylsilane (tri-functional) can be employed. Through the addition of branching, or cross-linking, ceramic yields as high as 77% have been obtained. Further, it is possible to dope these polymers, with boron for example, to control sintering and crystallization behavior.

While this process allows the addition of ethynyl side groups to potentially a wide range of available pre-ceramic polymers, there are other methods of directly synthesizing poly(ethynyl)carbosilane, which are outlined below. In both of the following reaction paths, tri-functional organotrichlorosilanes are utilized, in part or in entirety, to permit the introduction of photo-polymerizible side-groups, such as ethynyl groups derived from the reaction of sodium acetylide with chlorosilane.

In the first reaction route, sodium acetylide is reacted with the organotrichlorosilane, such as a methyl- or phenyl-trichlorosilane, as shown in step 1. Typically, this is performed in a solvent, such as hexane or methylene chloride. The by-product of this reaction is sodium chloride, which is insoluble and can be easily removed by filtration and/or sedimentation (step 2). The resulting organo(ethynyl)chlorosilane can be reacted directly with sodium which is a Wurtz type condensation reaction or mixed with an organodichlorosilane prior to the initiation of polycondensation. Assuming that all "R"s are the same, and "a+b=1", then the following reaction path can be proposed:

TABLE 1

New processing route 1: Steps and reaction chemistries to form poly(ethynyl)carbosilane-Final Product = $1/n\{SiR_{(a+2b)}C\equiv CH_{ag}\}_n$.

| Processing Step | Reaction |
| --- | --- |
| 1. The addition of ethynyl (acetylide) side groups to tri-functional polysilazane reactant. | a $\{RSiCl_3 + g\ NaC\equiv CH \rightarrow RSiCl_{(3-g)}C\equiv CH_g + g\ NaCl\}$ |
| 2. Remove NaCl by filtration. | −ag NaCl |
| 3. The addition of di-functional chain former (optional). | +b $\{R_2SiCl_2\}$ |
| 4. Condensation of modified precursor solution to produce poly(ethynyl)silazane pre-ceramic polymer through the addition of sodium. | a $(RSiCl_{(3-g)}C\equiv CH_g) + b\ (R_2SiCl_2) + 2[a(3-g) + b]Na \rightarrow 1/n\{Si_{(a+b)}R_{(a+2b)} C\equiv CH_{ag}\}_n + 2[a(3-g) + b]NaCl$ |

In route 1, the photo-cross-linkable ethynyl group (acetylide) is added prior to the initiation of Würtz type condensation reaction. In route 2, ethynyl side-groups are added post-condensation, thereby avoiding the exposure of the ethynyl ligand to sodium during pre-ceramic polymer synthesis. In this process, tri-functional chlorosilanes, or a mixture of di-functional and tri-functional chlorosilanes, are reacted with a sub-stoichiometric quantity of metallic sodium, sufficient to bring about an increase in molecular weight and viscosity of the now pre-ceramic polymer backbone, but leaving a fraction of the chlorosilane reaction sites unreacted. The resulting sodium chloride by-product can be removed by filtration and/or sedimentation (step 2).

Following polymer condensation, with unreacted chlorosilane sites intact, excess sodium acetylide is added to react with the aforementioned unreacted sites to produce poly(ethynyl)carbosilane photo-curable pre-ceramic polymer. The poly(ethynyl)carbosilane pre-ceramic polymer can be retrieved by solvent evaporation by the application of heat and/or in vacuo. Assuming that all "R"s are the same, and "a+b=1", the final desired reaction product is expressed in the reaction path below in Table 2.

TABLE 2

New processing route 2: Steps, and reaction chemistries, to form poly(ethynyl)carbosilane.

| Processing Step | Reaction |
|---|---|
| 1. Mixture of difunctional and trifunctional chlorosilames reacted with a sub-stoichiometric amount of sodium (where y < [3a + 2b]). | a (RsiCl$_3$) + b (R$_2$SiCl$_2$) + [y/(3a + 2b)] Na → (1/n) {Si$_{(a+b)}$R$_{(a+2b)}$Cl$_{[(1-y)/(3a+2b)]}$}$_n$ + [y/(3a + 2b)] NaCl |
| 2. Remove NaCl by filtration and/or sedimentation. | −[y/(3a + 2b)] NaCl |
| 3. Addition of ethynyl side groups to partially condensed polysilazane polymer through the addition of excess sodium acetylide. | (1/n){Si$_{(a+b)}$R$_{(a+2b)}$Cl$_{[(1-y)/(3a+2b)]}$}$_n$ + [(1 − y)/(3a + 2b)]NaC≡CH → (1/n) {Si$_{(a+b)}$R$_{(a+2b)}$ C≡CH$_{[(1-y)/(3a+2b)]}$}$_n$ + [(1 − y)/(3a + 2b)]NaCl |

Product = (1/n) {SiR$_{(a+2b)}$ C≡CH$_{[(1-y)/(3a-2b)]}$}$_n$.

In the previous section, the method of preparing poly(ethynyl)carbosilane, a photo-curable pre-ceramic polymer precursor to silicon carbide has been reviewed. In this section, several of the promising methods of synthesizing polysilazane precursors to silicon nitride (Si$_3$N$_4$) and a method of conversion to poly(ethynyl)silazane, a photo-curable pre-ceramic polymer precursor to high yield Si$_3$N$_4$/SiC ceramic matrix composites are described. Si$_3$N$_4$ doped with 10–15 weight percent SiC has significantly lower creep at high temperature than pure Si$_3$N$_4$. The creep rate at the minimum was lower by a factor of three than that of the unreinforced, monolithic matrix of equal grain size. Thus, other researchers have recognized the potential importance of Si$_3$N$_4$/SiC nanocomposite matrices for continuous ceramic fiber reinforced composites used in high temperature applications. Two advantages of the process of the process are the ability to fabricate large-scale composites employing existing polymer composite fabrication techniques due to the addition of the photo-cross-linkable ethynyl side-groups and the inclusion of the carbon containing ethynyl group should lead to the addition of approximately 5 to 20 weight percent SiC upon pyrolysis.

One of the simplest and direct methods of preparing polysilazane precursors to silicon nitride, with a 70 weight percent ceramic yield is to dissolve dichlorosilane in dichloromethane to yield polysilazane oils. Pyrolysis in flowing nitrogen gas yielded nearly phase pure a-Si$_3$N$_4$ after heat treatment at 1150° C. for 12 hours. Numerous other permutations and refinements to the preparation of polysilazane oils and polymers have been developed. The reaction path of polysilazane formation using dichlorosilanes and ammonia is set out below:

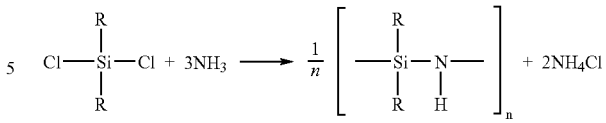

A number of the most direct permutations include the use of trichlorosilanes, methyltrichlorosilanes, dimethyldichlorosilanes, and vinyl-, butyl-, phenyl-, ethyl-, and hexyl-modified chlorosilanes. Increased molecular weight, and correspondingly increased ceramic yield, can be achieved by catalytically enhancing the cross-linking during final polymer preparation. A number of novel methods, including the use of ruthenium compounds and potassium hydride have been demonstrated to give ceramic yields upon pyrolysis as high as 85 percent. The inducement of cross-linking prior to pyrolysis is essential to achieving the high ceramic yields necessary to large-scale commercialization of Si$_3$N$_4$ matrix composites for high temperature applications. The cross-linking methods cited in the literature, however, are chemical catalysts, making the shaping and forming processes extremely difficult.

A ceramic matrix of predominantly silicon nitride with about 10–15% SiC by weight is nearly ideal for fabricating CMCs. In addition, the catalytic cross-linking of the polysilazane precursor dramatically increases ceramic yield. The synthesis route should produce high yield Si$_3$N$_4$/SiC nanocomposites employing a photocurable pre-ceramic polymer precursor.

One possible method would be to synthesize the unmodified polysilazane through the ammonolysis of various chlorosilane reactants in dichloromethane solvent followed by modifying the resulting polysilazanes, using a previously described process of chlorination followed by attachment of the ethynyl through reaction with sodium acetylide. Another alternative approach starts with a variety of dichlorosilanes and/or trichlorosilanes and reacts them with sodium acetylide at various concentrations, followed by ammonolysis to result in the final poly(ethynyl)silazane precursor as specifically detailed in the Table 3 below:

TABLE 3

Processing steps and reaction chemistries to form poly(ethynyl)silazane

| Processing Step | Reaction |
|---|---|
| 1. addition of acetylide side groups trifunctional polysilazane reactant. | a {RSiCl$_3$ + g NaCCH → RSiCl$_{(3-g)}$CCH$_g$ + g NaCl} |
| 2. remove NaCl by filtration | −g NaCl |
| 2. addition of difunctional chain former | b {R$_2$SiCl$_2$} |
| 3. ammonolysis of modified precursor solution to produce poly(ethynyl)silazane preceramic polymer | a [RSiCl$_{(3-g)}$CCH$_g$] + b [R$_2$SiCl$_2$] + NH$_3$ → b{[SiR$_2$(NH)]$_n$} + a{[RSi(NH)$_{(3-g)}$ CCH$_g$]$_m$} + 2[a(3 − g) + 2b]NH$_4$Cl |

The following are examples of combining commercially available polymers and catalysts to achieve a final photo-curable pre-ceramic polymer to SiC ceramics. In order to be photo-curable, the polymer requires either double-bonded carbons such as Allyl side groups or triple-bonded carbons such as acetylide or propargyl side groups. The catalysts can include a thermally curable component such as benzoil peroxide and a photo-curable initiator such as Ciba-Geigy's Irgacure 1800™ or a combination of camphorquinone and 2-(dimethylamino)-ethyl methacrylate).

EXAMPLE 1

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.02 |
| Photoinitiator 2 | None | None |

EXAMPLE 2

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.02 |
| RT initiator | N,N-dihydroxyparatoluidine | 0.02 |

EXAMPLE 3

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.01 |
| Photoinitiator 2 | none | None |

EXAMPLE 4

| Category | Compound | Amount (grams) |
|---|---|---|
| Polymer | Poly(ethynyl)carbosilane | 2.0 |
| Catalyst | Benzoil Peroxide | 0.02 |
| Photoinitiator 1 | Ciba-Geigy's Irgacure 1800 | 0.02 |
| Photoinitiator 2 | none | None |

EXAMPLE 5

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Camphorquinone | 0.02 |
| Photoinitiator 2 | 2-(dimethylamino)ethyl methacrylate. | 0.02 |

EXAMPLE 6

| Category | Compound | Amount (grams) |
|---|---|---|
| Polymer | Poly(ethynyl) carbosilane | 2.0 |
| Catalyst | Benzoil Peroxide | 0.02 |
| Photoinitiator 1 | Camphorquinone | 0.02 |
| Photoinitiator 2 | 2-(dimethylamino)ethyl methacrylate. | 0.02 |

EXAMPLE 7

| Category | Compound | Amount (grams) |
|---|---|---|
| Polymer | Allylhydridopolycarbosilane (5% allyl groups) | 2.0 |
| Catalyst | Benzoil Peroxide | None |
| Photoinitiator 1 | Camphorquinone | 0.02 |
| Photoinitiator 2 | 2-(dimethylamino)ethyl methacrylate. | 0.02 |

EXAMPLE 8

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Camphorquinone | 0.01 |
| Photoinitiator 2 | 2-(dimethylamino)ethyl methacrylate). | 0.01 |

EXAMPLE 9

| Category | Compound | Amount (grams) |
| --- | --- | --- |
| Polymer | Allylhydridopolycarbosilane (5% allyl groups) | 2.0 |
| Catalyst | Benzoil Peroxide | none |
| Photoinitiator 1 | Camphorquinone | 0.01 |
| Photoinitiator 2 | 2-(dimethylamino)ethyl methacrylate). | 0.01 |

All of the above examples cross-linked under photo-irradiation (using either ultraviolet light or blue light as indicated) within a few minutes to an hour under continuous irradiation at room temperature. The samples were transformed by this method from thermoplastic to thermoset pre-ceramic polymers which did not flow or deform significantly upon subsequent heat-treatment and pyrolysis, ultimately yielding SiC containing ceramics. The examples are meant to be illustrative. A person trained in the art can easily modify the ratios and selection of both pre-ceramic polymer and/or photo-initiators and catalyst combinations.

This process enables the continuous manufacture of fiber reinforced ceramic composites by the use of high ceramic yield pre-ceramic polymers which are photo-curable to a thermoset from a thermoplastic state. A composite in any form or shape is fabricated by photocuring each individual layer of fiber with in-situ pyrolysis of the pre-ceramic polymer impregnated into the fiber layer. The layer by layer of fiber, fabric or woven cloth is pressure loaded to press the thermoplastic polymer infiltrated fabric onto the mandrel or flat substrate thereby permitting excess polymer to impregnate the porous, already pyrolyzed, layer below. This single step process allows a shorter mean free path for volatiles to escape with less destruction then the removal of organics from more massive parts, for consolidation of each layer individually, and for increased layer to layer bonding and improved interlaminar shear strengths.

In general, other ethynyl containing reagents, such as 1-ethynyl-1-cyclohexanol and 1,1'-ethynylenedicyclohexanol, can be directly coupled, due to the presence of hydrolyl (OH) bonds, to either halosilane (Si—X, where X.dbd.F, Cl, Br) and/or silanol (Si—OH) groups in the pre-ceramic polymer. Benzoil peroxide or other chemical catalysts can be used in conjunction with double or triple bonded carbon side groups within the pre-ceramic polymer to achieve crosslinking.

A thermoplastic photo-curable pre-ceramic polymer as disclosed herein may be employed in a single-step fabrication process of continuous ceramic fiber ceramic matrix composites, in which the component is shaped by a variety of standard composite fabrication techniques, such as filament winding, tape winding, and woven cloth winding. For example, the process may include steps of passing ceramic fiber monofilament, tow, mat, or woven cloth through a solution of the thermoplastic photo-curable pre-ceramic polymer, applying ceramic fiber monofilament, tow, mat, or woven cloth to a moving flat substrate and using a heated or unheated compaction roller to press the thermoplastic pre-ceramic polymer coated ceramic fiber onto flat substrate. The process also includes the steps of using photo-light of the ultraviolet, visible, or infrared light spectrum to induce cross-linking (curing) of the photo-curable pre-ceramic polymer thereby rendering a thermoset polymer and either partially or completely pyrolyzing the now cured pre-ceramic polymer matrix coated ceramic fiber material. The pre-ceramic polymer poly(ethynyl)carbosilane yields silicon carbide upon pyrolysis. The pre-ceramic polymer may also yield oxide ceramic such as aluminum oxide upon pyrolysis. Other photo-curable pre-ceramic polymers may yield silicon nitride, aluminum nitride and titanium carbide, for example.

Various alternative methods for synthesizing a photo-curable pre-ceramic polymer are set forth below. A first process of forming a photo-curable pre-ceramic polymer, poly(ethynyl)-carbosilane to silicon carbide ceramic includes the steps of reacting sodium acetylide with organochlorosilanes and condensing (polymerizing) the resultant organo-(ethynyl)chlorosilane product of step a with an excess of an alkali metal. The organochlorosilane may be selected from a group of one or more of the following: dichlorodimethylsilane, trichloro-phenylsilane (tri-functional), and methyltrichlorosilane.

A second process of forming a photo-curable pre-ceramic polymer, poly(ethynyl)-carbosilane to silicon carbide ceramic includes the steps of reacting sodium acetylide with organochloro-silanes and condensing (polymerizing) the resultant organo(ethynyl)-chlorosilane product of step a with an excess of an alkali metal sodium. The organochlorosilane may be selected from a group of one or more of the following: dichlorodimethylsilane, trichloro-phenylsilane (tri-functional), and methyltrichlorosilane.

A third process of forming a photo-curable pre-ceramic polymer, poly(ethynyl)-carbosilane, to silicon carbide ceramic includes the steps of reacting sodium acetylide with a mixture of organodichlorosilanes and organotrichlorosilanes and condensing (polymerizing) the resultant organo(ethynyl)-chlorosilane product of step a with an excess of an alkali metal.

A fourth process of forming a photo-curable pre-ceramic polymer, poly(ethynyl)-carbosilane to silicon carbide ceramic includes the steps of reacting a sub-stoichiometric amount of an alkali metal with organochloro-silanes and reacting the partially polymerized polyorganochlorosilane with sodium acetylide. The organochlorosilane may be selected from a group consisting of one or more of the following: dichlorodimethylsilane, trichlorophenylsilane (tri-functional) and methyltrichlorosilane.

A fifth process of forming a photo-curable pre-ceramic polymer, poly(ethynyl)-carbosilane to silicon carbide ceramic includes the steps of reacting a sub-stoichiometric amount of sodium metal with organochlorosilanes and reacting the partially polymerized polyorganochlorosilane with sodium acetylide. The organochlorosilane may be selected from a group consisting of one or more of the following: dichlorodimethylsilane, trichlorophenylsilane (tri-functional) and methyltrichlorosilane.

A sixth process of forming a photo-curable pre-ceramic polymer, poly(ethynyl)carbosilane to silicon carbide ceramic includes the steps of reacting a sub-stoichiometric amount of an alkali metal with a mixture of organodichlorosilanes and organotrichlorosilanes and reacting the partially polymerized polyorganochlorosilane with sodium acetylide. The organochlorosilane may be selected from a group consisting of one or more of the following: dichlorodimethylsilane, trichlorophenylsilane (tri-functional) and methyltrichlorosilane.

A seventh process of forming a photo-curable pre-ceramic polymer, poly(ethynyl)silazane, to silicon nitride ceramic includes the steps of reacting sodium acetylide with orga-nochlorosilanes and condensing (polymerizing) the resultant organo(ethynyl)chlorosilane product of step a with ammonia. The organochlorosilane may be selected from a group consisting of one or more of the following: dichlorodimethylsilane, trichlorophenylsilane (tri-functional) and methyltrichlorosilane.

An eighth process of forming a photo-curable pre-ceramic polymer, poly(ethynyl)-silazane to silicon nitride ceramic includes the steps of reacting sodium acetylide with organochlorosilanes and condensing (polymerizing) the resultant organo(ethynyl)-chlorosilane product of step a with ammonia.

A ninth process of forming a photo-curable pre-ceramic polymer, poly(ethynyl)silazane, to silicon nitride ceramic includes the steps of reacting sodium acetylide with a mixture of organodichlorosilanes and organotrichloro-silanes and condensing (polymerizing) the resultant organo (ethynyl)chlorosilane product of step a with ammonia. The organochlorosilane is selected from a group consisting of one or more of the following: dichlorodimethylsilane, trichlorophenylsilane (tri-functional) and methyltrichlorosilane.

A tenth process of forming a photo-curable pre-ceramic polymer, poly(ethynyl)-silazane to silicon nitride ceramic includes the steps of reacting a sub-stoichiometric amount of ammonia with organochlorosilanes and reacting the partially polymerized polyorganochlorosilazane with sodium acetylide. The organochlorosilane may be selected from a group consisting of one or more of the following: dichlorodimethylsilane, trichlorophenylsilane (tri-functional) and methyltrichlorosilane.

An eleventh process of forming a photo-curable pre-ceramic polymer, poly(ethynyl)-silazane to silicon nitride ceramic includes the steps of reacting a sub-stoichiometric amount of ammonia with organochlorosilanes and reacting the partially polymerized polyorganochlorosilazane with sodium acetylide. The organochlorosilane may be selected from a group consisting of one or more of the following: dichlorodimethylsilane, trichlorophenylsilane (tri-functional) and methyltrichlorosilane.

A twelth process of forming a photo-curable pre-ceramic polymer, poly(ethynyl)-silazane to silicon nitride ceramic includes the steps of reacting a sub-stoichiometric amount of ammonia with a mixture of organodichlorosilanes and organotrichlorosilanes and reacting the partially polymerized polyorganochlorosilazane with sodium acetylide.

A process for fabricating ceramic matrix composites includes the steps of (a) preparing a solution of thermoplastic photo-curable pre-ceramic polymer, (b) passing a pre-preg through the solution of thermoplastic photo-curable pre-ceramic polymer, (c) applying the pre-preg to a shaped mandrel, (d) using light energy to induce cross-linking of the photo-curable pre-ceramic polymer after application to the mandrel whereby the thermoplastic pre-ceramic polymer is curved and (e) pyrolyzing the cured thermoplastic pre-ceramic polymer matrix composite material.

For further example, fabrication of continuous ceramic fiber ceramic matrix composites employing a thermoplastic photo-curable pre-ceramic polymer may include a variety of standard composite fabrication techniques, such as filament winding, tape winding, and woven cloth winding. An exemplary process includes steps of (a) passing ceramic fiber monofilament, tow, mat, or woven cloth through a solution of the thermoplastic photo-curable pre-ceramic polymer, (b) applying ceramic fiber monofilament, tow, mat, or woven cloth to a shaped mandrel, (c) using photo-energy of the ultraviolet, visible or infrared light spectrum to induce cross-linking (curing) of the photo-curable pre-ceramic polymer after application to the mandrel and (d) either partially or completely pyrolyzing the now cured pre-ceramic polymer matrix composite material. The pre-ceramic polymer may comprise poly(ethynyl)carbosilane. The pre-ceramic polymer may yield silicon carbide upon pyrolysis. In addition, or in the alternative, after pyrolysis the process may yield titanium carbide, aluminum nitride, silicon nitride, or aluminum oxide, depending on the particular pre-ceramic polymer employed.

A second exemplary process includes steps of (a) passing ceramic fiber monofilament, tow, mat, or woven cloth through a solution of the thermoplastic photo-curable pre-ceramic polymer, (b) applying ceramic fiber monofilament, tow, mat, or woven cloth to a shaped rotating mandrel, (c) use of a heated or unheated compaction roller to press the thermoplastic pre-ceramic polymer onto the mandrel, (d) using ultraviolet, visible, or infrared light to induce cross-linking (curing) of the photo-curable pre-ceramic polymer thereby rendering a thermoset polymer, (e) either partially or completely pyrolyzing the now cured pre-ceramic polymer matrix material and (f) followed by the final heat treatment of the shaped ceramic matrix composite "brown body". The pre-ceramic polymer may comprise poly(ethynyl)carbosilane. The pre-ceramic polymer may yield silicon carbide upon pyrolysis. In addition, or in the alternative, after pyrolysis the process may yield titanium carbide, aluminum nitride, silicon nitride, or aluminum oxide, depending on the particular pre-ceramic polymer employed.

A third single-step fabrication of continuous ceramic fiber ceramic matrix composites employing a thermoplastic photo-curable pre-ceramic polymer includes steps of (a) passing ceramic fiber monofilament, tow, mat, or woven cloth through a solution of the thermoplastic photo-curable pre-ceramic polymer, (b) applying ceramic fiber monofilament, tow, mat, or woven cloth to a moving flat substrate, (c) using a compaction roller to press the thermoplastic pre-ceramic polymer coated ceramic fiber onto flat substrate, (d) using photo-light of the ultraviolet, visible, or infrared light spectrum to induce cross-linking (curing) of the photo-curable pre-ceramic polymer thereby rendering a thermoset polymer and (e) either partially or completely pyrolyzing the now cured pre-ceramic polymer matrix coated ceramic fiber material. The pre-ceramic polymer may comprise poly(ethynyl)carbosilane, yielding silicon carbide upon pyrolysis. In addition, or in the alternative, after pyrolysis the process may yield titanium carbide, aluminum nitride, silicon nitride, aluminum oxide, or other oxide ceramic, depending on the particular pre-ceramic polymer employed.

As illustrated by the following example, photocurable poly(ethynyl)carbosilane can be synthesized directly from difunctional and trifunctional chlorosilane reagents with the addition of sub-stoichiometric amounts of sodium to form poly(chloro) silanes, followed by the addition of excess sodium acetylide to provide photocurable cross-linking sites.

Sodium metal suspension (40% by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. The mixture of methylene bromide, dichlorodimethylsilane, and trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in tetrahydrofuran (THF). The appropriate amount of sodium acetylide powder was dissolved in dimethyl formamide (DMF) and added slowly to the poly(chloro) carbosilane polymer solution and an exothermic reaction occurs and the color of the polymer solution turned a deep orange. Reaction byproducts were removed by filtration and the final poly(ethynyl)carbosilane polymer was obtained.

Six different examples of PECS (poly(ethynyl)carbosilane), with varying ethynyl groups concentrations have been prepared as shown in Table 4. Ethynyl concentration varied from 0 to 25 percent (by mole).

In order to characterize the molecular weight and molecular weight distributions of polymers synthesized and utilized in this study, HPLC was utilized. A carefully prepared calibration curve was measured using NIST traceable molecular weight standards and measuring elution time. From this calibration curve, we were able to estimate the peak molecular weight of the PECS synthesized based upon the chromatograms.

TABLE 4

Poly(ethynyl)carbosilane polymers synthesized in this study.
Poly(ethynyl)carbosilane Synthesis Matrix

| | Reactants | | TRIAL 1 0% A/100% B | | | TRIAL 2 5% A/95% B | | | TRIAL 3 10% A/90% B | | |
|---|---|---|---|---|---|---|---|---|---|---|---|
| | NAME | MW | MOL | ML | GM | MOL | ML | GM | MOL | ML | GM |
| A | TCMS | 149.48 | 0.0000 | 0.0000 | 0.000 | 0.0025 | 0.2936 | 0.374 | 0.0050 | 0.5871 | 0.747 |
| B | DCMS | 129.07 | 0.0500 | 6.0653 | 6.454 | 0.0475 | 5.7621 | 6.131 | 0.0450 | 5.4588 | 5.808 |
| C | Methylene | 173.85 | 0.0500 | 3.5093 | 8.693 | 0.0500 | 3.5093 | 8.693 | 0.0500 | 3.5093 | 8.693 |
| D | NA | 23 | 0.2000 | | 4.600 | 0.2000 | | 4.600 | 0.2000 | | 4.600 |
| E | NA | 48 | 0.0000 | | 0.000 | 0.0025 | | 0.120 | 0.0050 | | 0.240 |
| D | 40% Na-Oil | | | | 11.500 | | | 11.500 | | | 11.500 |
| E | 17.3% Na | | | | 0.000 | | | 0.694 | | | 1.387 |
| | | | TRIAL 3 15% A/85% B | | | TRIAL 4 20% A/80% B | | | TRIAL 5 25% A/75% B | | |
| | NAME | MW | MOL | ML | GM | MOL | ML | GM | MOL | ML | GM |
| A | TCMS | 149.48 | 0.0075 | 0.8807 | 1.121 | 0.0100 | 1.1742 | 1.495 | 0.0125 | 1.4678 | 1.869 |
| B | DCMS | 129.07 | 0.0425 | 5.1555 | 5.485 | 0.0400 | 4.8523 | 5.163 | 0.0375 | 4.5490 | 4.840 |
| C | Methylene | 173.85 | 0.0500 | 3.5093 | 8.693 | 0.0500 | 3.5093 | 8.693 | 0.0500 | 3.5093 | 8.693 |
| D | NA | 23 | 0.2000 | | 4.600 | 0.2000 | | 4.600 | 0.2000 | | 4.600 |
| E | NA | 48 | 0.0075 | | 0.360 | 0.0100 | | 0.480 | 0.0125 | | 0.600 |
| D | 40% Na-Oil | | | | 11.500 | | | 11.500 | | | 11.500 |
| E | 17.3% Na | | | | 2.081 | | | 2.775 | | | 3.468 |

In Table 5 below, several of our polymers are compared with Dow Corning PCS. Our materials were purposely prepared as viscous fluids for greater ease in fabrication.

TABLE 5

Molecular Weights and HPLC Elution Times (peak) for PECS Synthesized by MATECH and Compared with Dow Corning PCS

| POLYMER | ELUTION TIME | MORPHOLOGY | MOLECULAR WEIGHT |
|---|---|---|---|
| Dow Corning PCS | 14.468 | Solid Flake | 4400 |
| PECS (0% ethynyl) A | 16.598 | Viscous Fluid | 750 |
| PECS (0% ethynyl) B | 16.449 | Viscous Fluid | 700 |
| PECS (5% ethynyl) | 16.050 | Viscous Fluid | 1300 |
| PECS (15% ethynyl) | 16.862 | Viscous Fluid | 600 |
| PECS (20% ethynyl) A | 16.504 | Viscous Fluid | 700 |
| PECS (20% ethynyl) B | 15.973 | Viscous Fluid | 1400 |
| PECS (25% ethynyl) | 16.732 | Viscous Fluid | 580 |

One of the polymers synthesized as described above was used to fabricate a ceramic matrix composite using woven ceramic fabric. 7.0 grams of Poly(ethynyl)carbosilane with 15% ethynyl side-groups for cross-linking was impregnated into 4 layers of woven ALTEX fabric. The resulting pre-preg was photocured over night to produce cross-linked matrix and then fired in Argon gas to 1200° C. for one hour. The resulting product was a ceramic coupon suitable for testing and evaluation.

The polymer synthesized above, 7.0 grams of Poly (ethynyl)carbosilane with 15% ethynyl side-groups for cross-linking was impregnated into 4 layers of woven ALTEX fabric. The resulting pre-preg was photocured overnight to produce cross-linked matrix and then fired in Argon gas to 1200° C. for one hour. The resulting product was a ceramic coupon suitable for testing and evaluation.

The resulting SiC ceramic matrix composite (CMC) has been characterized. After only two processing cycles, the resulting CMC has an apparent density of 2.134 grams/cc only two processing cycles, the resulting CMC has an apparent density of 2.134 grams/cc and a porosity of 38.24 percent (%). In addition, it exhibits good strength and sounds very much like a ceramic when tapped. Scanning Electron Microscopy (SEM) photomicrographs reveal that the woven fiber tows (of approximately 500 monofilaments each) are well bonded with minimal porosity, even at high magnification. Large pores are still present between tows, however, which can permit further densification through repeated polymer-impregnation-pyrolysis (PIP) cycles.

EXAMPLE 10

For 25% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 4.840 grams dichlorodimethylsilane, and 1.869 grams trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in 50 ml tetrahydrofuran (THF). 0.600 grams of sodium acetylide powder was dissolved in 5.0 ml dimethyl formamide (DMF) and added slowly to the poly(chloro) carbosilane polymer solution. An exothermic reaction occurred and the color of the polymer solution turned a deep purple-red. Reaction byproducts were removed by filtration and the final poly(ethynyl)carbosilane polymer dissolved in THF was obtained. The polymer was then extracted from the filtrate by evaporation in a Rotovapor apparatus, yielding approximately 8.0 grams of poly(ethynyl)carbosilane.

EXAMPLE 11

For 20% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 5.163 grams dichlorodimethylsilane, and 1.495 grams trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in 50 ml tetrahydrofuran (THF). 0.480 grams of sodium acetylide powder was dissolved in 5.0 ml dimethyl formamide (DMF) and added slowly to the poly(chloro) carbosilane polymer solution and an exothermic reaction occurred and the color of the polymer solution turned a deep purple-red. Reaction byproducts were removed by filtration and the final poly(ethynyl)carbosilane polymer dissolved in THF was obtained. The polymer was then extracted from the filtrate by evaporation in a Rotovapor apparatus, yielding approximately 8.0 grams of poly(ethynyl)carbosilane.

EXAMPLE 12

For 15% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 5.485 grams dichlorodimethylsilane, and 1.121 grams trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in 50 ml tetrahydrofuran (THF). 0.360 grams of sodium acetylide powder was dissolved in 5.0 ml dimethyl formamide (DMF) and added slowly to the poly(chloro) carbosilane polymer solution and an exothermic reaction occurred and the color of the polymer solution turned a deep purple-red. Reaction byproducts were removed by filtration and the final poly(ethynyl)carbosilane polymer dissolved in THF was obtained. The polymer was then extracted from the filtrate by evaporation in a Rotovapor apparatus, yielding approximately 8.0 grams of poly(ethynyl)carbosilane.

EXAMPLE 13

For 10% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 5.808 grams dichlorodimethylsilane, and 0.747 grams trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in 50 ml tetrahydrofuran (THF). 0.240 grams of sodium acetylide powder was dissolved in 5.0 ml dimethyl formamide (DMF) and added slowly to the poly(chloro) carbosilane polymer solution and an exothermic reaction occurred and the color of the polymer solution turned a deep purple-red. Reaction byproducts were removed by filtration and the final poly(ethynyl)carbosilane polymer dissolved in THF was obtained. The polymer was then extracted from the filtrate by evaporation in a Rotovapor apparatus, yielding approximately 8.0 grams of poly(ethynyl)carbosilane.

EXAMPLE 14

For 5% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 6.131 grams dichlorodimethylsilane, and 0.374 grams trichlorophenylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting poly(chloro)carbosilane polymer was extracted from the filtrate by evaporation in a Rotovapor apparatus. The resulting dark yellow viscous polymer was dissolved in 50 ml tetrahydrofuran (THF). 0.120 grams of sodium acetylide powder was dissolved in 5.0 ml dimethyl formamide (DMF) and added slowly to the poly(chloro) carbosilane polymer solution and an exothermic reaction occurred and the color of the polymer solution turned a deep purple-red. Reaction byproducts were removed by filtration and the final poly(ethynyl)carbosilane polymer dissolved in THF was obtained. The polymer was then extracted from the filtrate by evaporation in a Rotovapor apparatus, yielding approximately 8.0 grams of poly(ethynyl)carbosilane.

EXAMPLE 15

For 0% ethynyl side-group substitution, 11.50 grams of sodium metal suspension (40% sodium by weight) in oil was weighed. The suspension was washed three times in xylene and separated by centrifugation. The washed sodium was added to 200 ml of xylene in the triple-neck reaction vessel. The refluxed reaction vessel was heated under flowing argon to 100° C. A mixture of 8.693 grams methylene bromide, 6.454 grams dichlorodimethylsilane was slowly added using a burette. An exothermic reaction ensued and the temperature of reaction vessel contents reached 133° C. and the mixture boiled vigorously under reflux for approximately 30 minutes. The mixture was stirred for an additional hour while cooling. The dark purple/brown mixture, containing precipitates, was filtered and a clear yellow filtrate was obtained.

The resulting polycarbosilane polymer was extracted from the filtrate by evaporation in a Rotovapor apparatus yielding approximately 8.0 grams of polycarbosilane with no ethynyl side-groups.

As demonstrated by the following examples, several commercially available preceramic polymers can be made photocurable. The preceramic polymer CERASET™ SZ inorganic polymer sold by Honeywell Advanced Composites, Inc., which is a silazane-based polymer, can be made photocurable to both UV and blue light through the addition of photoinitiators. Also, the preceramic polymer allylhydridopolycarbosilane (AHPCS) polymer manufactured by Starfire Systems, Inc. can be made photocurable to both UV and blue light through the addition of photoinitiators.

EXAMPLE 16

A UV light photocurable polysilazane was produced by mixing 2.00 grams of CERASET™ SZ inorganic polymer with 0.50 grams of IRGACURE® 1800, manufactured by Ciba Specialty Chemicals, dissolved in 0.50 ml tetrahydrofuran. The resulting yellow fluid, upon exposure to a high intensity UV lamp, became a stiff, rigid polymer within an hour. The resulting cross-linked polymer maintained its shape upon heating and pyrolysis to 1200° C. in flowing argon gas. The ceramic yield of the pyrolyzed polymer was in excess of 80 percent. A control sample, without the photoinitiator, remained fluid after in excess of 24 hours of continuous UV irradiation.

EXAMPLE 17

A blue light photocurable polysilazane was produced by mixing 2.00 grams of CERASET™ SZ inorganic polymer with 0.50 grams of Camphorquinone, obtained from Aldrich Chemical Company, dissolved in 0.50 ml tetrahydrofuran. The resulting yellow fluid, upon exposure to a high intensity blue lamp, became a stiff, rigid polymer within an hour. The resulting cross-linked polymer maintained its shape upon heating and pyrolysis to 1200° C. in flowing argon gas. The ceramic yield of the pyrolyzed polymer was in excess of 80 percent. A control sample, without the photoinitiator, remained fluid after in excess of 24 hours of continuous blue light irradiation.

EXAMPLE 18

A UV light photocurable allylhydridocarbosilane was produced by mixing 2.00 grams of allylhydridocarbosilane (15% allylchloride) polymer with 0.50 grams of IRGACURE® 1800, manufactured by Ciba Specialty Chemicals, dissolved in 0.50 ml tetrahydrofuran. The resulting yellow fluid, upon exposure to a high intensity UV lamp, became a stiff, rigid polymer within an hour. The resulting cross-linked polymer maintained its shape upon heating and pyrolysis to 1200° C. in flowing argon gas. The ceramic yield of the pyrolyzed polymer was in excess of 80 percent. A control sample, without the photoinitiator, remained fluid after in excess of 24 hours of continuous UV irradiation.

EXAMPLE 19

A blue light photocurable allylhydridocarbosilane was produced by mixing 2.00 grams of allylhydridocarbosilane (15% allylchloride) polymer with 0.50 grams of Camphorquinone, obtained from Aldrich Chemical Company, dissolved in 0.50 ml tetrahydrofuran. The resulting yellow fluid, upon exposure to a high intensity blue lamp, became a stiff, rigid polymer within an hour. The resulting cross-linked polymer maintained its shape upon heating and pyrolysis to 1200° C. in flowing argon gas. The ceramic yield of the pyrolyzed polymer was in excess of 80 percent. A control sample, without the photoinitiator, remained fluid after in excess of 24 hours of continuous blue light irradiation.

From the foregoing it can be seen that processes of forming a photo-curable pre-ceramic polymer and their applications have been described.

It is intended that the foregoing disclosure shall be considered only as an illustration of the principle of the present process. The invention is defined by the appended claims.

What is claimed is:

1. A process for synthesizing photo-curable poly(ethynyl)carbosilane, comprising the steps of:
   reacting a sub-stoichiometric amount of an alkali metal with an organochlorosilane, thereby forming a partially polymerized polyorganochlorosilane; and
   reacting the partially polymerized polyorganochlorosilane with sodium acetylide to form photo-curable poly(ethynyl)carbosilane.

2. The process of claim 1, in which the organochlorosilane comprises a mixture of organodichlorosilane and organotrichlorosilane.

3. The process of claim 1, in which the organochlorosilane comprises a mixture selected from dichlorodimethylsilane, trichlorophenylsilane, and methyltrichlorosilane.

4. The process of claim 1, further comprising removing sodium chloride after the first reacting step.

5. The process of claim 1, further comprising condensing the partially polymerized polyorganochlorosilane.

6. The process of claim 1, further comprising dissolving the partially polymerized polyorganochlorosilane in a solvent prior the second reacting step.

7. The process of claim 1, further comprising retrieving the photo-curable poly(ethynyl)carbosilane by solvent evaporation.

8. The process of claim 1, further comprising retrieving the photo-curable poly(ethynyl)carbosilane by filtration.

* * * * *